Sept. 9, 1969 L. E. SIEMS ET AL 3,466,596
METHOD AND MEANS OF COMPOSITING DATA
Filed Nov. 6, 1968 6 Sheets-Sheet 1

Lee E. Siems
W. Clay Reeves
INVENTORS

BY Arnold, Roylance,
Kruger & Durkee
ATTORNEYS

Lee E. Siems
W. Clay Reeves
INVENTORS

BY Arnold, Roylance,
Kruger & Durkee
ATTORNEYS

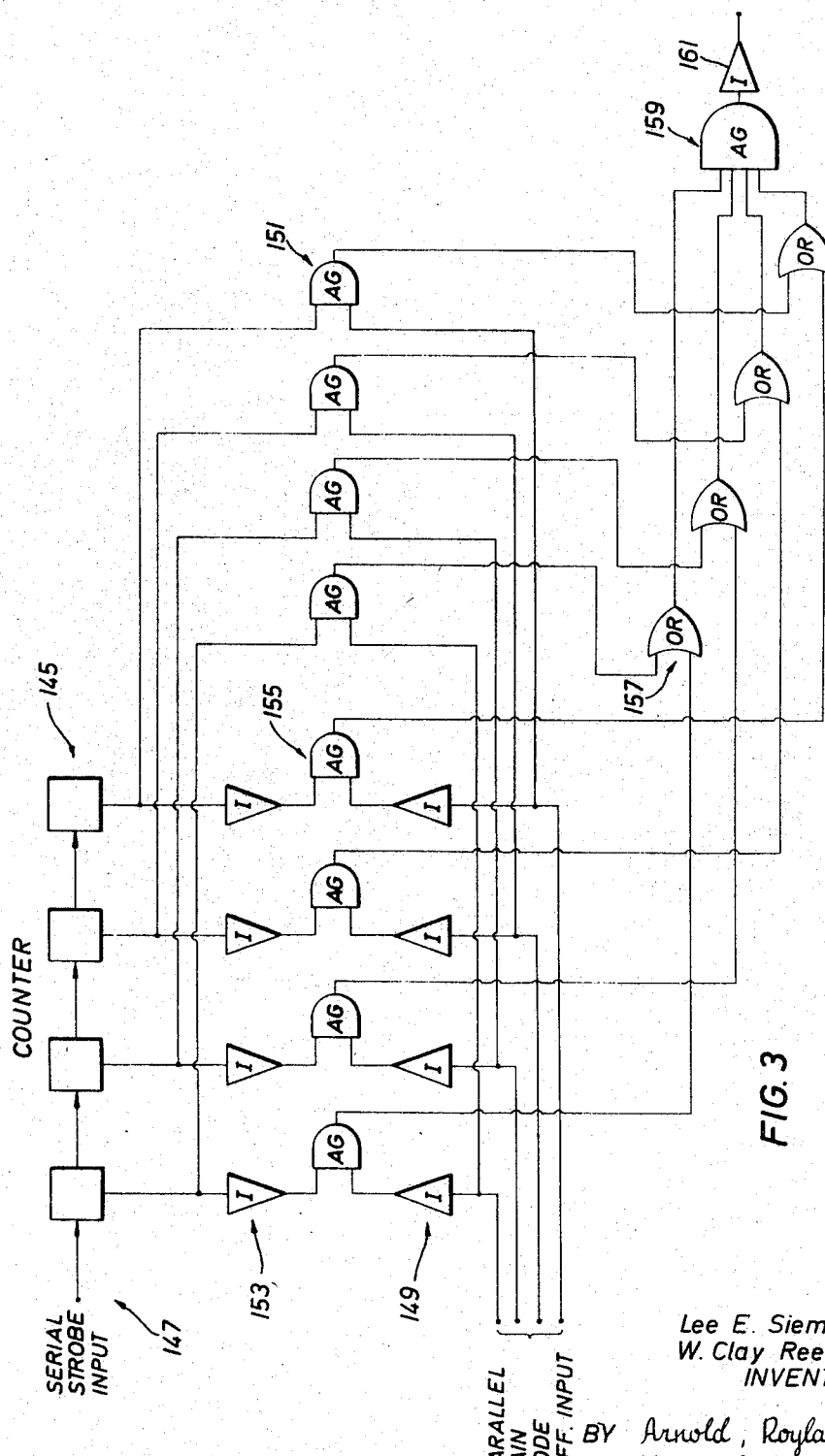

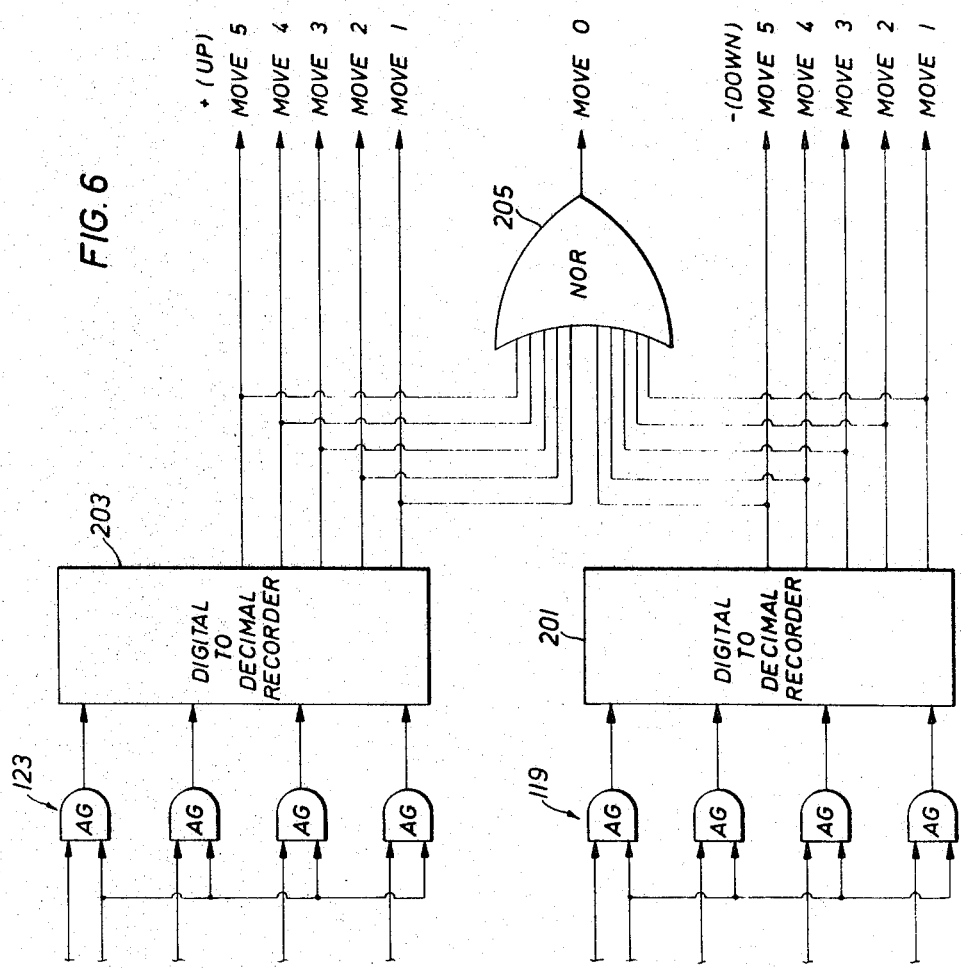

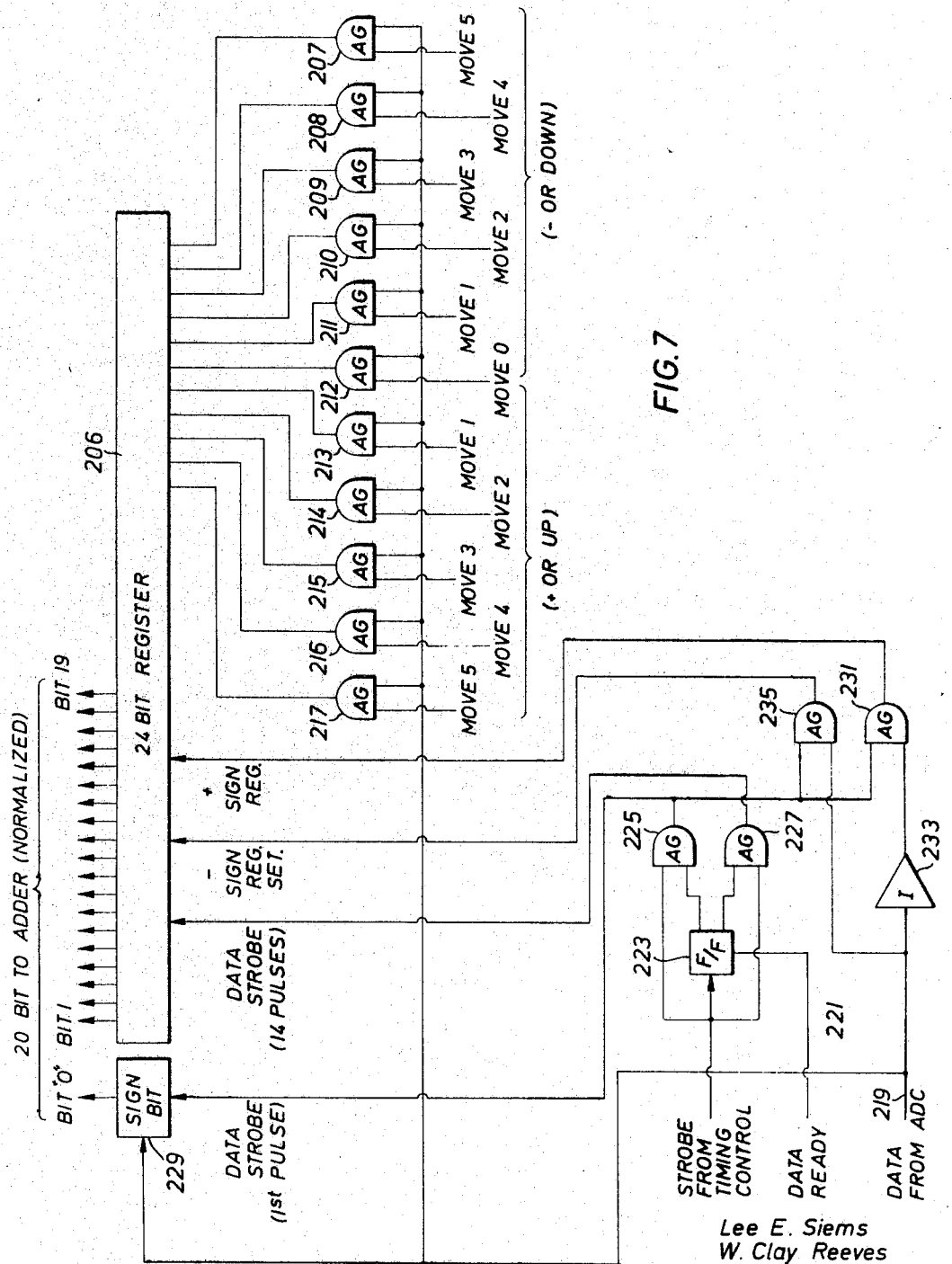

United States Patent Office 3,466,596
Patented Sept. 9, 1969

1

3,466,596
METHOD AND MEANS OF COMPOSITING DATA
Lee E. Siems and W. Clay Reeves, Houston, Tex., assignors to Digital Data Systems, Inc., Houston, Tex., a corporation of Texas
Continuation-in-part of application Ser. No. 698,339, Jan. 16, 1968. This application Nov. 6, 1968, Ser. No. 773,868
Int. Cl. G01v 1/00
U.S. Cl. 340—15.5     17 Claims

ABSTRACT OF THE DISCLOSURE

Method and means of recording and compositing time-related attenuated signals utilizing amplifiers whose gains change inversely to the attenuation of the signals. Incoming signals are converted to digital data and normalized to previously recorded time-related data. The normalized data and the previously recorded data are then summed and recorded.

BACKGROUND OF THE INVENTION

Field of the invention

This is a continuation-in-part of application Ser. No. 698,339, filed Jan. 16, 1968, now abandoned.

This invention relates to data acquisition systems, and in particular to data acquisition systems and methods of recording data utilizing digital techniques. The invention has particular application in the geophysical field of seismic exploration for compositing seismic data, but it is not limited thereto.

Description of the prior art

In seismic exploration, shock waves are established in the earth by a suitable energy source, and the propagated waves are reflected back to the surface where they are detected by transducers known as seismometers. The seismometers convert the waves into electrical signals which are recorded by various means. From wave analysis of the recorded signals, it is possible to infer the earth's subsurface structure.

Typically, a shock wave is established by a one shot source such as a charge of dynamite or a repetitive source such as Vibroseis. A plurality of seismometers monitor reflected shock wave, and the electrical signals generated by the seismometers are passed through variable gain amplifiers to a magnetic storage means or to a recorder such as a seismic camera or oscillograph.

Unfortunately, in many areas the seismic signals received by the seismometers are obscured by ground noise. However, since the signal is repetitive while the noise is random, the signal-to-noise ratio can be improved by adding or compositing several seismic records made at a given location. By compositing the records, the desired signal is reinforced while the undesired random noise tends to cancel out.

At one time the analog signals produced by the seismometers were recorded in analog form on magnetic tape or other recording means. However, with the advent of digital techniques for handling data, it has become common practice to convert the analog data to digital form for processing or storing and later converting back to analog form for visual display. Digital techniques have increased the speed of handling the seismic data and also expanded the mathematical operations which can be performed on the data. Digital techniques have been applied not only in data acquisition, but also in compositing data. For example, U.S. Patent No. 3,340,499 issued Sept. 7, 1967, discloses a digital compositor. However, all digital compositing systems to date are limited in operation to data acquition systems having conventional automatic gain control amplifiers or programmed controlled gain amplifiers.

As stated above, variable amplifiers are needed for the incoming seismic signals because the signals decay with time. Until recently, programmed controlled gain amplifiers have been used to compensate for the decay in the received signal. However, the continuous time varying amplification factor of these amplifiers does not allow full utilization of the storage capacity of the digital storage means and also limits the program possibilities in a digital computer.

A binary gain ranging amplifier has proved much more useful in digital recording equipment. The gain of this amplifier is determined by the strength of either the input or output signal of the amplifier. When the signal decreases to one-half of a reference value, the gain of the amplifier is automatically increased by six db thereby bringing the signal back up to the reference level. Thus, the signal is amplified inversely to the attenuation thereof. This amplifier offers many advantages including maximum utilizaiton of the recording scale and simplification of computer processing. A detailed discussion of binary gain amplifiers and the advantages thereof is found in an article by Lee Seims and Fred W. Hefer entitled "A Discussion on Seismic Binary Gain Switching Amplifiers," Geophysical Prospecting, volume IV, No. 1, pages 23–34, 1967, which is incorporated herein by reference.

Of course, in compositing data the incoming data which is to be added to previously recorded data must have the same gain exponent as the time-related recorded data. With a programmed amplifier, the gain exponent is the same for data having the same time relationship relative to the time break or initial shock wave. However, with binary gain amplifiers the data does not necessarily have the same time-related exponents since signals may have different decay rates. Thus, until now, the use of binary gain amplifiers has been limited to recordation of single records of data.

The present invention comtemplates compositing means and methods especially suited for compositing data in a data acquisition system using binary gain amplifiers, and the like.

SUMMARY OF INVENTION

The method and apparatus in accordance with this invention is especially suited for compositing digital data obtained from a digital data acquisition system utilizing binary gain amplifiers.

As a complete system, the apparatus includes binary gain amplifiers for amplifying incoming signals from seismometers or other sources, analog to digital converter means, multiplexer means, normalizer means, digital summing means, and storage means.

The first input data is passed through the amplifiers, converters, and multiplexer and recorded in the storage means. A gain code from the binary gain amplifiers is also recorded. The gain code is the exponent of the gain expressed in powers of two.

Subsequent data is algebraically added to the stored data and the sum is recorded in the storage means. Before the data is summed, the incoming data is normalized by comparing the gain code of the incoming data to the recorded gain.

To insure that the capacity of the storage means is not surpassed, means are provided to drop the least significant digits of the stored data and adjust the gain code of the recorded data when the data exceeds a preselected level.

The composited data may be fed to a digital-to-analog converter for field display or the data may be passed through a formatter to a permanent storage means. The formatter places the digital data in the form necessary for computer processing without additional processing.

BRIEF DESCRIPTION OF THE DRAWINGS

So that the manner in which the above-recited advantages and objects of the invention, as well as others which will become apparent, are attained can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the drawings:

FIG. 3 is a block diagram of a digital comparator circuit which may be employed in the circuit shown in FIG. 2.

FIGS. 6 and 7 show a circuit for developing normalized data and transferring this data to a compatible digital adder.

DESCRIPTION OF PREFERRED EMBODIMENTS

Figure 1:
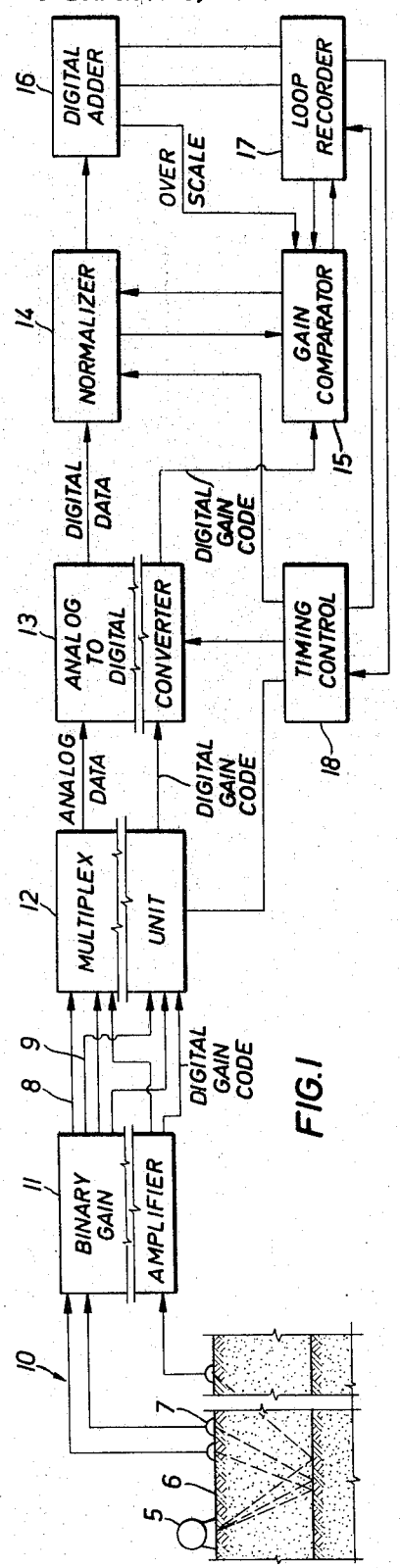
FIG. 1 is a simplified block diagram of a preferred data acquisition and compositing system in accordance with this invention.

Referring now to FIG. 1, a data acquisition compositing system in accordance with the invention is shown in functional block diagram form. Most of the blocks are conventional, commercially available apparatus as will be described below.

In conventional manner, a means, such as vibrator 5 is used for establishing shock waves in earth 6 at the ground point of seismic investigation. The vibrator may conveniently take the form of a repetitive source such as Vibroseis. Seismometers 7 are located conveniently for recording the reflected waves resulting from the established shock waves. The signals 10 developed from these seismometers are in analog form and represent a typical group of signals from a typical analog source for treatment in accordance with the present invention.

Signals 10 from the analog source are passed through an amplifier unit 11 comprising a plurality of binary gain amplifiers. The amplified analog signals are fed to a plural channel multiplex unit 12.

Although three incoming lines are shown, these are intended to be representative, as many more separate channels of incoming analog data are usually developed. Twenty-four is a common number of individual data channels employed in seismic exploration studies.

An individual binary gain amplifier is employed in each separate data channel. Each such amplifier produces a signal 8 having an analog value and a gain code 9 in digital form. In the preferred embodiment discussed herein this gain code is represented as a 4-bit digital code (indicating the exponent of the gain expressed in powers of two). The gain code is supplied to subsequent circuits in a parallel format (i.e., a separate "0" or "1" for each of the four digit bits). The gain code formatted in this manner may be also referred to as a 4-bit parallel binary digital word. The digital gain code produced by each amplifier is passed to the multiplex unit, along with its corresponding analog signal.

The multiplexed analog signal is passed to an analog to digital converter 13, which may be of the successive approximation type. To accomplish the desired operation, multiplex unit 12 sequentially connects the binary gain amplifiers in unit 11 to analog to digital converter 13 in time sharing fashion. As is well known, each of a plurality of analog signals can be sequentially sampled and the sampled amplitude value of the signal converted to a digital form. To perform this operation the multiplex unit and the analog to digital converter are jointly controlled by an appropriate clock or timing signal. Timing control circuit 18, including an appropriate crystal oscillator means and timing delay means for producing clock or strobe pulses, is connected to both the multiplex unit and the analog to digital converter to control the sampling and control operation for synchronizing the system. The developed digital code corresponding to the sampled analog amplitude is referred to as the digital data. A complete description of each signal requires, however, the digital data and the digital gain code.

Each channel of digital data is separately treated and eventually separately recorded. Since during the particular time of its operation, each data channel functions in a similar manner, only the operaton of one such channel is discussed hereinafter.

In the analog to digital converter, the analog signal is temporarily stored in a sample and hold amplifier while the signal is synthesized with successive weighted increments of voltage derived from a precision reference voltage source and resistance ladder network. The converter produces a serial binary digital word which is applied to normalizer 14. In the preferred system described herein, this converted analog data signal is a 15-bit word. (The output from the converter could be in parallel form, as well.) The digital gain code corresponding to the data code is passed through the analog digital converter without processing to a gain comparator 15, for a purpose which is hereinafter described.

The normalizer, which may be thought of as principally comprising a shift register, accepts the digital data word from the converter and temporarily stores the word. In the preferred embodiment, the normalizer shift register has the capacity for accepting a 20-bit word, although only a 15-bit word is applied thereto. For the first incoming data, occurring at the first sampling occurrence, the data is passed through the normalizer without processing and through a digital adder 16 to a loop recorder 17. Also recorded with the first input data is the system timing control in the form of timing pulses from timing control circuit 18. The timing control signal merely coordinates or synchronizes the operation of the loop recorder in the operation of the overall system in a manner to be described. Coordination of such a loop recorder may be performed in the manner described in Patent 3,340,499, C. F. Hadley, where a scheme for locating recording and reading heads and for locating tracks for the individual data channels is described. Any convenient scheme or suitable recording medium may be used.

The gain code corresponding to the first digital data is also passed from the gain comparator 15 to the loop recorder in a time-matched relationship with its digital data. All subsequent data (taken at the subsequent sample occurrences) is sequentially temporarily stored in normalizer 14 while its corresponding gain code is compared with the recorded gain code from the gain comparator. Should the gain codes differ, the data in the shift register or normalizer 14 is adjusted so that the incoming data can be properly added to the previously recorded data applied back from the recorder to digital adder 16. This operation is repeated for each subsequent sampled digital data, the new data being added to that which has been previously accumulated and the gain code of the first sample being used as the reference (unless modified by the overscale number, explained hereinafter).

To understand what normalizing is, an analogy can be drawn to the adding of regular decimal numbers. If the minuend of $3 \times 10^{14}$ is to be added to a subtrahend which is $3 \times 10^{11}$, before the 3's can be added the decimal point of the subtrahend must be located with respect to the decimal point of the minuend. This is effectively done by subtracting 11 from 14 to obtain a number by which the decimal point is moved to the left in the subtrahend. In this case the number is 3. Then by adding the two numbers a total of $3.003 \times 10^{14}$ results. Hence, the gain comparator merely develops the difference between the gain codes (the effective exponent values of the power of two by which the data is multiplied). The normalizer locates the digital data information in the shift register for its being added to the accumulated data in the digital adder.

Figure 2:
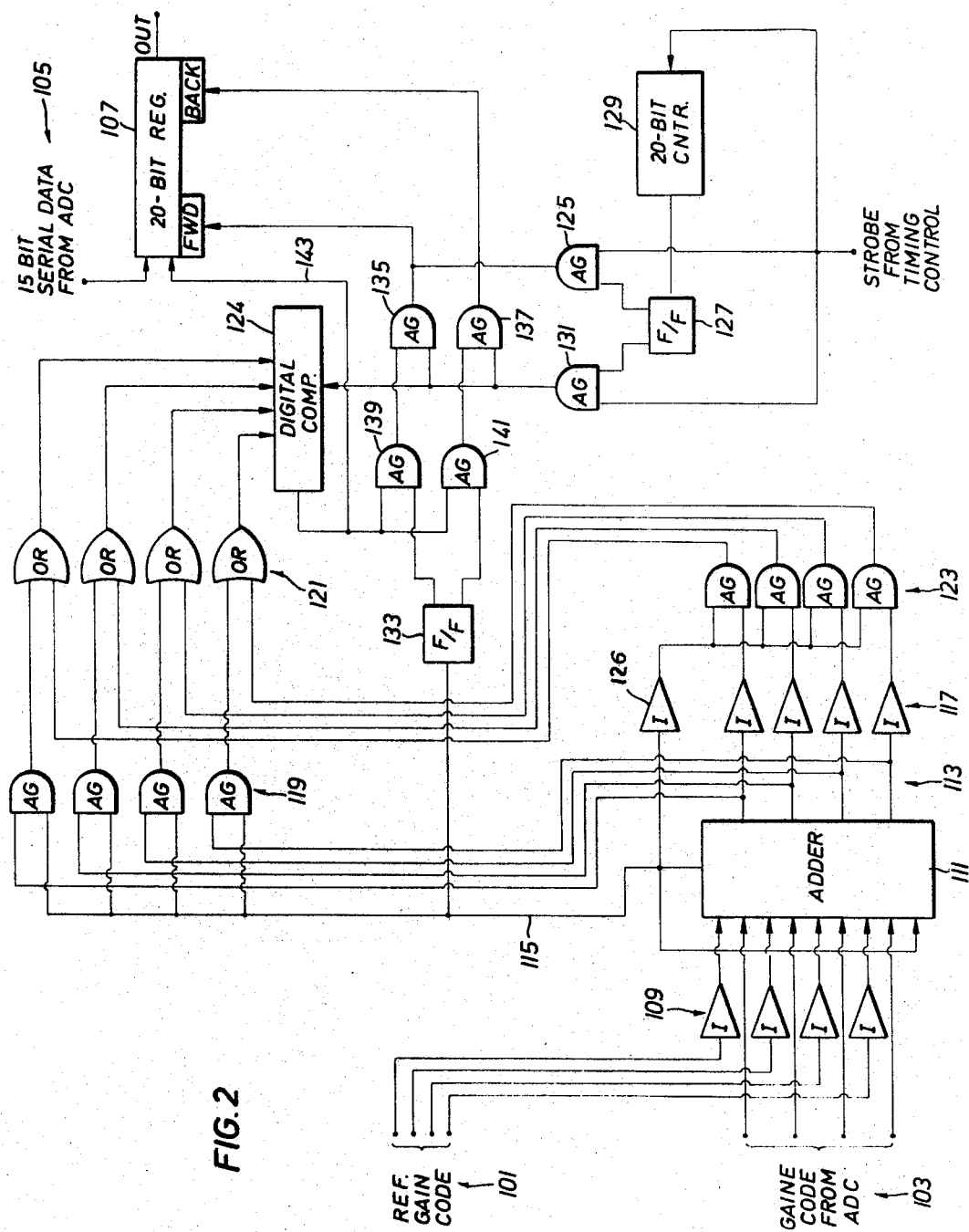
FIG. 2 is a block diagram of a gain comparator and a normalizer circuit which may be employed in the circuit shown in FIG. 1.

Now referring to FIG. 2, a more detailed block diagram of the gain comparator and normalizer circuit is shown. There are two gain code inputs to this diagram, reference gain code 101 and the gain code 103 from the analog to digital converter circuit. This later gain code is a gain code which corresponds to the 15-bit serial data 105 which is supplied to 20-bit register 107 in a manner hereafter explained.

Reference gain code 101, in parallel 4-bit form, is supplied to inverters 109 to develop the complementary number related to the actual gain code number supplied. Gain code 103 is not inverted. Both the complementary reference gain code number and the actual gain code number from the analog to digital converter is supplied to a 4-bit binary full adder 111, which may be typically a type SN7483N semiconductor network developed by Texas Instruments Incorporated.

A parallel 4-bit output 113 is developed, as well as a carry select number 115. This carry select number is applied back to the first stage of the adder, in conventional manner. To better understand how the adder works, the following examples will be helpful. Assume that the reference gain code is 5, or in digital form, 0101. Inverted, the complementary number of this reference gain code is 1010. Assume that the gain code from the analog to digital converter is one less than the reference gain code. This number is 4, or in digital form, 0100. The result of adding 1010 to 0100 is 1110. When this output is inverted (in inverters 117), the digital number 0001 results.

On the other hand, when the gain code number from the analog to digital converter is a higher number than the reference gain code number, the operation of the adder may be understood by the following example. If again the reference digital code is 0101, the complement thereof is 1010. Assume that the gain code from the analog to digital converter is 0110 (digital equivalent of 6). By adding 1010 to 0110 the result is 10000. By applying the carry number 1 back to the units column a total result is accomplished which is equal to 0001. This is the number applied to AND gates 119 in FIG. 2.

If the gain code from the analog to digital converter is higher than the reference code number AND gates 119 are enabled by carry select signal 115. Hence, output 113 is applied through OR gates 121 to the digital comparator 123. On the other hand, if the gain code from the analog to digital converter is less than the reference gain code number AND gates 123 connected to inverters 117 are enabled by the complementary number of the carry select signal 115 which is developed from inverter 125. The outputs of AND gates 123 are then applied through OR gates 121 to digital comparator 123.

Before discussing how the digital comparator operates, the operation of the 20-bit register (normalizer) will be helpful. The input 15-bit serial data is applied to the 20-bit register at the same time strobe pulses are received from the timing control circuit through AND gate 125. The other input to AND gate 125 is from a conventional flip-flop circuit 127, whose output enables gate 125 to permit the first 20 pulses for each circuit operation to pass therethrough. It will be seen that the pulses are normally applied through AND gate 125 to the forward shift connection to register 107. Although only 15 bits of serial information is contained in the data supplied from the analog to digital converter, 20 strobe pulses are applied through gate 125 to shift the 15-bit information to the fifteen least significant positions in the register. At the same time the 20 bits are applied to the register for moving the serial data thereinto, a counter 129 is receiving the same 20 strobe pulses. After 20 bits are counted an output from the counter is supplied to flip-flop circuit 127 to cause it to change state. This changing of state disenables gate 125 and enables AND gate 131.

When gate 131 is enabled, strobe pulses from the timing control circuit are applied therethrough to digital comparator 123. Also, pulses are supplied to AND gates 135 and 137.

Depending upon the presence or nonpresence of a carry select signal 115, the output from flip-flop circuit 133 will enable either AND gate 139 or 141. Both of these AND gates share a common enabling output from digital comparator 123. Hence, whichever of these gates is enabled by flip-flop 133, either gate 135 or 137 is enabled. Therefore, beginning with the twenty-first pulse, strobe pulses from gate 131 are applied to either shift register 107 forward or backward through either gate 135 or 137, in a conventional manner.

The disenabling of either gate 139 or 141 is accomplished by the digital comparator circuit 123. Supplied in parallel data form from OR gates 121 is the difference of the gain codes which have been developed. When pulses are applied through gate 131 to 123 in serial form after the 20-bit number has been reached which corresponds to the number from OR gate 121, an output is produced which effectively shuts off gates 139 and 141. At the same time, an unload signal 143 is produced to the 20-bit register, which causes the data stored therein to be transferred or unloaded to the output (which is connected to digital adder 16). This signal may also be used, after appropriate delay if necessary, to reset the circuit for subsequent operation.

It will be seen that carry select signal 115 determines whether or not the number as originally placed into the register is shifted forward or backwards. When it shifts forward, the least significant digits are lost.

Now referring to FIG. 3, an expanded block diagram of a circuit is shown which may be used as the digital comparator 123 shown in FIG. 2.

A conventional counter 145 receives serial strobe pulses 147 at its input. The parallel gain code difference input information from OR circuits 121 is supplied to inverters 149 (for developing complementary outputs) and directly to AND gates 151. It will be seen that there is a separate inverter 149 for each digit of the parallel gain code and an AND gate 155 connected to each inverter. In similar fashion, the output from each of the counter stages is supplied to an inverter 153 and to AND gates 151. The respective inverters 153 are supplied to the same series of AND gates 155 as inverters 149. Digit OR gates 157 are connected to the respective AND gates 151 and 155. When the parallel gain code and the serial count instantaneously in the counter are such that each of the four stages either match in their "0" or "1" form, OR gates 157 which are respectively connected to each of the four pairs of AND gates 151 and 155 will all product an output. When there is an output from each of the four OR gates 157 supplied to AND gate 159, there is an output therefrom. Since the desired operation of the diagram shown in FIG. 2 requires the output from the digital comparator to disenable gates 139 and 141, an inverter 161 is employed to permit this operation.

An alternate circuit is shown in FIGS. 6 and 7 for developing normalized data and transferring this data to a compatible digital adder 16.

Now referring to FIG. 6, a circuit is shown for developing an 11-line unitary number from two 4-line binary inputs suitable for applying serial data information into the register of FIG. 7, to be hereinafter explained.

The input stages to the circuit of FIG. 6 may be identical to the circuit of FIG. 2 up through AND gates 119 and 123, and hence this part of the circuit is not duplicated in the illustration. In the FIG. 6 circuit the series of AND gates 119 and 123 develop a number for application to digital-to-decimal decoder 201 or 203, respectively, as heretofore explained with respect to the description of FIG. 2. These digital-to-decimal decoder circuits may be of conventional form for developing a unitary output. That is, the output which is developed will be developed as an output on a single line dependent on the input digital signal applied to the decoder circuit. If the decimal number which is developed is 1, then an output is developed on the move 1 line of the digital-to-decimal decoder. Likewise, any number more than one will be developed on the respective output line. It should be noted that for numbers greater than 5 an output on move 5 line will be developed.

It should be remembered that because there can only be an output from either AND gates 119 or from AND gates 123, there will only be a single output resulting from the two digital-to-decimal decoders at any one time.

All of the output lines from each digital-to-decimal decoder 201 and 203 are applied to NOR gate 205, which develops an output only when there is an absence of a signal on one of the other ten lines. For convenience of reference the outputs from digital-to-decimal decoder 201 may be referred to as the negative move (shift) outputs or "down" outputs and the outputs from digital-to-decimal decoder 203 may be referred to as the positive or "up" move outputs.

Now referring to FIG. 7, it may be seen how the development of the 11-line unitary output as described above is used for the development of the properly shifted or "normalized" data signal in a 24-bit register 206. The 11 output connections from decoders 201 and 203 and from NOR gate 205 are applied to AND gates 207 through 217 in the following manner: the negative move 5 connection is applied to AND gate 207. the negative move 4 connection is applied to AND gate 208, the negative move 3 connection is applied to AND gate 209, the negative move 2 connection is applied to AND gate 210, the negative move 1 connection is applied to AND gate 211, the move 0 connection is applied to AND gate 212, the positive move 1 connection is applied to AND gate 213, the positive move 2 connection is applied to AND gate 214, the positive move 3 connection is applied to AND gate 215, the positive move 4 connection is applied to AND gate 216 and the positive move 5 connection is applied to AND gate 217.

The digital data from the ADC (circuit 13 in FIG. 1) is supplied to the circuit of FIG. 7 in serial form on line 219, which in turn, is supplied to each of AND gates 207 through 217. It will be seen that depending on which of these AND gates is open, the supplied data is supplied to or enters 24-bit register 206 at the appropriate entry point. Therefore, assuming for example that the data is 14 bits long and the positive move 5 signal is present, AND gate 217 will be enabled for the supplying of data from the analog-to-digital converter. This will result in the bit 1 position of the register receiving the most significant data bit.

In similar fashion, it may be seen that if the move 0 signal is present, AND gate 212 will be enabled and the bit 6 position of the register will receive the most significant data bit. And, finally, when the negative move 5 signal is present, AND gate 207 will be enabled for the supplying of data from the analog-to-digital converter so that the bit 11 position of the register will receive the most significant data bit. Therefore, it is readily apparent that the proper movement or shifting of the data is accomplished at the time of entry.

The timing of the entry of the data and the placement of the data into the register at the correct sign (so that when the data is unloaded into the subsequent digital adder proper accumulation will occur) is provided by the other circuits shown in FIG. 7. Before a digital data sequence is to occur, a data ready signal is supplied one line 221 to a flip-flop circuit 223. This data ready signal may be derived through an OR gate connected to the 11 outputs of the FIG. 6 circuit and a delay circuit, so that after the previous data sequence occurs, a data ready signal is produced for the next subsequent data sequence event. Of course, other methods of establishing a data ready signal may be provided.

In any event, the data ready signal set flip-flop 223 so that the first strobe pulse from the timing control circuit causes flip-flop 223 to change state and to produce a disenabling output to AND gate 225 for one pulse only (after which the flip-flop changes state) and to produce an enabling output to AND gate 227. The first strobe pulse from the timing control circuit is also directly applied to AND gate 225 and will pass therethrough before it closes to the sign bit, one digit register 229. Hence, the first data bit in the digital data from the ADC on line 219 produces from this sign register an appropriate indication of whether the count to be stored in the register should be added or subtracted from the accumulated value in the subsequent circuit.

Also, if the count to be stored in 24-bit register 206 is to be added in the subsequent digital added, then the register must be "cleared" (the states of each position in the register placed to the zero condition). This is done by connecting the output from AND gate 225, which supplies only the first pulse from the timing control circuit, to AND gate 231. The other input to AND gate 231 is from inverter circuit 233, connected to line 219. When the first data bit on line 219 is positive, the inverter will change the bit to negative, which will then clear register 206.

On the other hand, if the count to be stored in 24-bit register 206 is to be effectively subtracted in the subsequent digital adder, then the register is "set" (all states of the register placed to one) so that as the data is placed into the register, actually the complement is placed therein. Upon subsequent accumulation in the digital adder, the result will be effective subtraction.

The setting of register 206 is performed in a similar manner for clearing, just discussed. The first strobe pulse from the timing control circuit is applied tthrough AND gate 225 to AND gate 235, which has line 219 as its other input. When the first bit of the data sequence on line 219 is negative, it is supplied through AND gate 235 to register 206 to place all of the states of the register to one. The inverted negative signal from inverter 233 is blocked by gate 231 and has no effect on register 206.

After the first pulse from the timing control circuit is produced to act on the circuit shown in FIG. 7 in the above manner, the subsequent pulses are applied through AND gate 227 to sequentially strobe in the data applied through whichever gate 207 through 217 is enabled, as previously explained. Either the data ready signal or the first pulse from the subsequent data sequence may be used as the unload signal for supplying the registered data to the subsequent digital adder.

It should be noted that a parallel output is shown from the register of FIG. 7, which would require a compatible input connection scheme for the subsequent receiving digital adder. It should also be observed that the reason for having a 24-bit register (rather than a 19-bit register) is to provide sufficient bits therein to permit the entry scheme of supplying the register with data in the above-described manner when there is a negative move 5 signal applied to AND gate 207.

Now returning to FIG. 1, the digital adder has a finite capacity such that if the summed data in this adder exceed a preselected amount, it would normally undesirably not accept additional data which would increase its most significant digit. Therefore, an overscale gain code is produced which is added to the reference gain code from loop recorder 17 to be applied to gain comparator 15. Of course, it is not necessary for the overscale gain control to produce an output only when the most significant digit is full, it may produce such a signal before this time is reached. For example, the adder may have a 20-digital-bit capacity, and when the 18th bit is utilized by the summed data, an overscale gain control signal is produced. Upon receiving this signal, the gain comparator adjusts the reference gain control, which is then applied to and recorded by the loop recorder 17, as before. That is, after each sample the gain code which is in the comparator as a referene is rerecorded on the loop recorder and is used again. By associating the accumulated data with a new reference gain code, this operation effectively shifts the summed data applied back to the digital adder to prevent it from being overcrowded. Accordingly, the system is able to sum a large number of recordings without overscaling, although the least significant bit information will eventually be lost.

As previously indicated, the loop recorder 17 is a standard digital tape unit. Operation of the recorder is synchronized with the operation of the multiplex unit 12, the analog to digital converter 13 and the normalizer 14 by means of timing control 18. The timing control signal which is recorded on the loop recorder is used for synchronizing the drive mechanism of the loop recorder, and hence the signals therefrom and thereto, with the pulses being produced from timing control circuit 18. It will be recalled that signals from the timing control circuit are recorded on the loop recorder along with the first run of data in a manner described in Patent 3,340,499. Thereafter, the recorded signals are used to maintain synchronism of the clock or strobe pulses produced from the timing control circuit which are applied to the multiplex unit, the analog to digital converter unit and the normalizer. Synchronism may be obtained, in part, by even controlling the speed of the recording tape transport by the timing control signals.

Figure 4:
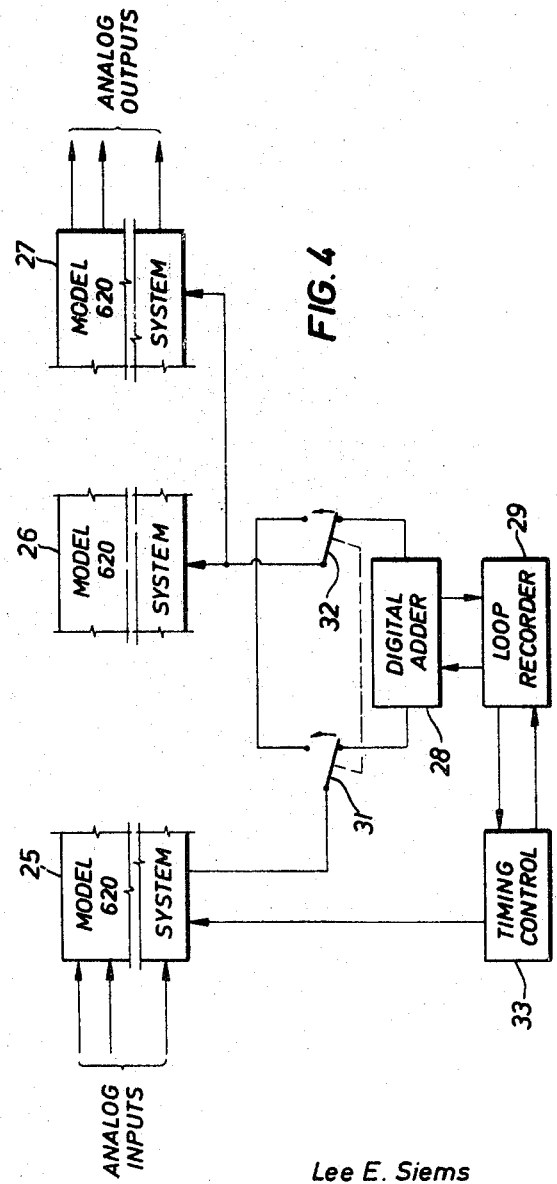
FIG. 4 is a simplified block diagram of compositing apparatus in accordance with the invention operatively connected with commercially available data acquisition and recording apparatus.

FIG. 4 is a block diagram of compositing apparatus in accordance with the invention operatively connected with commercially available seismic digital data acquisition apparatus, such as the Model 610 Field Seismic System of Redcor Corporation or of the Model 620 Binary Gain Field Digital Recording System of Digital Data System, Inc., the present assignee.

The front end portion 25 of the Model 620 system, for example, includes binary gain amplifiers, a multiplex unit, and an analog to digital converter, while the back end portion 26 includes a formatter and a permanent storage recorder. In addition, portion 27 includes a digital to analog converter unit for field display. "Format" as defined by the Society of Exploration Geophysicists (SEG) is "the arrangement of information as recorded on any recording media." Therefore, a formatter as used herein is a device which is used for accepting existing data and rearranging, recording, reforming, etc., so that the data may be compatible for subsequent use in a given system application. For example, coverting digital information to an analog signal for visual display purposes is a type of formatting. Of course, many other types of formatters are available.

A digital adder 28 (including a normalizer and a gain comparator, as described above) and a loop recorder 29 are connected between portion 25 and portions 26 and 27. Switches 31 and 32 are provided so that the Model 620 system can function in its normal capacity as strictly a digital acquisition system by bypassing the digital adder 28. A timing control circuit 33, is provided to synchronize operation of the loop recorder and the Model 620 system to which it is connected, as above described.

Figure 5:
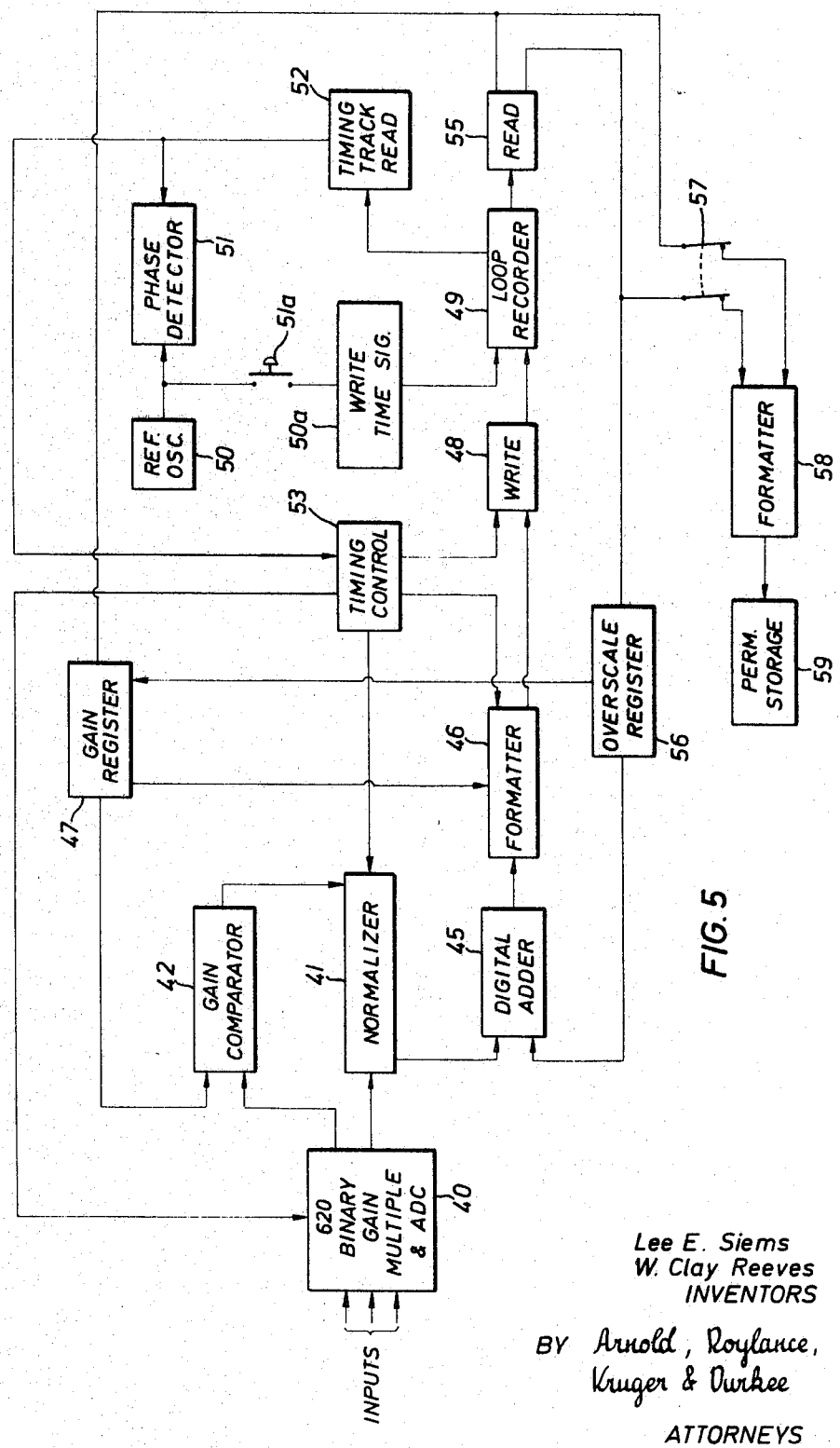
FIG. 5 is a block diagram which further illustrates the compositing portion of the apparatus of FIG. 4.

Reference is now made to FIG. 5 in describing the elements of a compositor compatible with the Model 620 digital recording system. Seismic data in 15-bit serial binary digital form is passed from the multiplexer unit and analog to digital conversion portion 40 of the Model 620 system to a data normalizer 41. The normalizer includes a 20-bit shift register, as above described, wherein data is stored while the 4-bit gain code of the incoming data is compared in gain comparator 42 with the gain code of the recorded data from gain register 47, as below described. The 20-bit shift register is operably controlled by the gain comparator and adjusts the stored data to agree with the stored gain code. The normalized data is then passed to adder 45 where the data is added to the stored data. The summed data is then passed to formatter 46 along with the 4-bit gain code from gain register 47, the gain register being unloaded at the corresponding time the accumulated data from the digital adder is passed to formatter 46. The formatter assigns a voltage or frequency to each digit of the code that is compatible with the subsequent recording apparatus.

The formatted data is passed from formatter 46 to a standard digital tape unit which includes the necessary write electronics 48 for writing the data magnetically on loop recorder 49, which is typically a tape loop. It is appreciated that the recording of the newly summed data erases the data previously recorded on the tape in each of the recording channels. The recorder preferably includes 1-inch tape with standard 24-track record/reproduce heads with each track having 20-bit capacity. The tape loop also records the synchronizing timing signal, which is derived from a reference oscillator 50 when recording the initial seismic data, as explained above with respect to FIG. 1, through write electronics 50a when switch 51a is closed. Accurate speed control of the loop recorder is achieved through the use of a phase lock servo system including phase detector 51. Phase detector 51 receives the servo control inputs from reference oscillator 50 and from timing track read unit 51 which develops its signal from the timing of signal recorded on the loop. Thus the time relationship between the incoming data and the previously recorded data is accurately controlled and synchronized. The recorded clock or strobe signal is applied to and synchronizes timing control 53 which, in turn, controls the timing of the electronics system. As above described, the timing control circuit determines the sequence of operation for compatible time operation of the Model 620 equipment (binary gain amplifiers, multiplex unit and analog to digital converter), formatter 46, write electronics 48 and normalizer 41.

A signal also may be recorded on the tape loop recorder as a time break for detonating an explosive charge or as a sweep signal for a mechanical source such as Vibroseis.

In the compositing operation, the recorded data on the tape loop is monitored by a read unit 55 which passes the gain code to the gain register 47 for holding until the proper time for applying to the gain comparator. At the same time, the seismic data is read and applied to an overscale shift register 56. If the data applied to the register 56 exceeds a preselected number, 10 bits, for example, the least significant bit is dropped and a signal is passed to gain register 47 where the gain code temporarily stored therein is adjusted accordingly. The accumulated recorded data in the overscale register is passed to adder 45 where the normalized data from normalizer 41 is added thereto in properly aligned bit form. Thus, the overscale register allows the system to sum a large number of recordings without exceeding the storage capacity of the loop recorder by adjusting the stored gain register number and thereby changing the reference gain code which is applied to the gain comparator.

The digital data and the gain code from read electronics 55 may be applied through a double-throw switch 57 to an external formatter 58 and permanent storage means 59, if desired.

As above described, the present invention combines the advantages of variable gain amplifiers such as binary gain ranging type and digital data compositors.

While the invention has been described with reference to a specific embodiment, the description is illustrative and not to be construed as limiting of the scope of the invention. Various modifications and changes may occur to those skilled in the art without departing from the spirit and scope thereof.

What is claimed is:

1. Apparatus for compositing and recording a variably attenuated signal comprising
   (a) variable gain amplifier means for amplifying said variably attenuated signal,
   (b) analog to digital conversion means for converting the amplified signal to digital data,
   (c) normalizer means for normalizing said digital data to previously recorded data,
   (d) adder means for adding the normalized digital data and said previously recorded data, and
   (e) recorder means for reproducibly recording the summed digital data.

2. Apparatus for compositing and recording the variably attenuated signal in accordance with claim 1 wherein said variable gain amplifier means produces a digital code representative of the gain of said variable gain amplifier means and said apparatus includes gain code comparator means for comparing the gain code of said variable gain amplifier means and the recorded gain code of said previously recorded data.

3. Apparatus for compositing and recording the variably attenuated signal in accordance with claim 2, and further including gain code register means connecting said recorder means to said gain code comparator means, data register means connecting said recorder means to said adder means, said data register means detecting an overscale of said recorded data and responsive to an overscale detection by adjusting said previously recorded data downscale, said gain code register means being operably connected to said data register means to increase the registered gain code when the registered data is adjusted downscale.

4. Apparatus for compositing and recording a variably attenuated signal comprising
   (a) a variable gain amplifier means the gain of which is determined by the relative strength of the input signal, said amplifier means producing a gain code repesentation of the gain thereof,
   (b) means for applying said variably attenuated signal to the input of said variable gain amplifier means,
   (c) gain code comparison means operably connected to receive and compare the gain code from said variable gain amplifier means and a recorded gain code,
   (d) normalizer means,
   (e) analog-to-digital conversion means connecting the output of said variable gain amplifier means to said normalizer means,
   (f) said normalizer means being responsive to said gain code comparator means by adjusting the digital data from said analog-to-digital conversion means to said recorded gain code,
   (g) adder means operably connected to receive and add digital data from said normalizer means and recorded digital data,
   (h) recorder means operably connected with said adder means for receiving and recording the output of said adder means and said recorded gain code,
   (i) means for reading previously recorded data and previously recorded gain code,
   (j) means for applying said previously recorded gain code to said gain code comparison means, and
   (k) means for applying said previously recorded data to said adder means.

5. Apparatus for compositing and recording a variably attenuated signal in accordance with claim 4, wherein said normalizer means includes a shift register,
   said means for applying said previously recorded data to said adder means includes a data register for detecting an overscale of said previously recorded data and responsive to an overscale detection by adjusting said previously recorded data downscale,
   said means for applying said previously recorded gain code to said gain code comparison means includes a gain code register means, said gain code register means being operably connected to said data register means to increase the registered gain code when the registered data is adjusted downscale.

6. Seismic prospecting appartus comprising
   (a) means for establishing shock waves in the earth,
   (b) means for detecting reflections of said shock waves and generating analog electrical signals,
   (c) variable gain amplifier means for amplifying said analog electrical signals,
   (d) means for converting the amplified analog signals to digital data,
   (e) normalizer means for normalizing said digital data to previously recorded data,
   (f) adder means for adding the normalized digital data and said previously recorded data, and
   (g) recorder means for reproducibly recording the summed digital data.

7. Seismic prospecting apparatus in accordance with claim 6, wherein said variable gain amplifier means produces a digital code representative of the gain of said variable gain amplifier means, and said apparatus includes gain code comparison means for comparing the gain code of said variable gain code amplifier means and the recorded gain code of said previously recorded data, said normalizer means being responsive to said gain code comparison means in adjusting the digital data from said converter means to said recorded gain code.

8. Seismic prospecting apparatus in accordance with claim 7, and further including gain code register means connecting said recorder means to said gain code comparison means, data register means connecting said recorder means to said adder means, said data register means being capable of detecting and overscale of said recorded data and responsive to an overscale detection by adjusting said previously recorded data downscale, said gain code register means being operably connected to said data register means to increase the register gain code when the register data is adjusted downscale.

9. Apparatus for compositing and recording a variably attenuated analog signal at a sample time occurrence, comprising
   (a) binary gain amplifier means for producing an analog amplitude value and a gain code, said gain code being the exponent value of a power of two by which the analog value is multiplied to obtain its actual value,
   (b) analog to digital converter means for converting the analog amplitude value to digital data,
   (c) normalizer means including a shift register for temporarily storing the digital data,
   (d) gain comparator means for developing a difference value between the gain code from the binary gain amplifier and a reference gain code, said difference value determining the position of the digital data in said normalizer means shift register,
   (e) adder means for adding the digital data from said normalizer to previously recorded data, and
   (f) recorder means connected to said adder means for reproducibly recording the acculated digital data from said adder means, said recorder means also connected to said gain comparator for recording an associated reference gain code.

10. Apparatus in accordance with claim 9, wherein said recorder means applied the reference gain code to the gain comparator and the accumulated digital data to said adder means at subsequent sample time occurrences.

11. Apparatus in accordance with claim 10, wherein said digital adder includes a register for temporarily storing the acculated digital data, an overscaling thereof resulting in a lowering of the associated reference gain code supplied to said gain comparator and subsequently recorded in said recorder means.

12. Apparatus in accordance with claim 9, and including timing control means for synchronizing the sample time occurrence operation of said analog to digital converter means, said normalizer means and said recorder means.

13. Apparatus in accordance with claim 12, wherein said recorder means records timing pulses along with the recorded accumulated digital data and associated reference gain code for controlling the synchronizing operation of said timing control means.

14. The method of compositing repetitive, variably attenuated signals comprising
  (a) amplifying said repetitive signals inversely to the attenuation thereof,
  (b) converting said amplified signals to digital data,
  (c) normalizing the digital data to time-related recorded digital data,
  (d) adding the normalized digital data and the time-related recorded digital data, and
  (e) reproducibly recording the summed digital data.

15. The method as defined by claim 14 and further including
  producing a digital gain code representative of the amplification of the amplified data,
  comparing the digital gain code of the amplified data with a time-related recorded gain code, and
  normalizing the digital data in response to the comparison of the gain codes.

16. The method of compositing and recording seismic signals comprising
  (a) producing seismic waves in the earth,
  (b) detecting reflections of said seismic waves and producing analog electrical signals thereof,
  (c) amplifying said analog electrical signals inversely to the attenuation thereof,
  (d) converting said amplified analog signals to digital data,
  (e) normalizing the digital data to time-related recorded digita data,
  (f) adding the normalized digital data to the time-related recorded digital data, and
  (g) reproducibly recording the summed digital data.

17. The method in accordance with claim 16 and including
  producing a digital gain code representative of the amplified analog signal,
  comparing the digital gain code of the amplified signal with a time-related recorded gain code, and
  normalizing the digital data in response to the comparison of the gain codes.

References Cited
UNITED STATES PATENTS

| | | | |
|---|---|---|---|
| 3,376,557 | 4/1968 | Godinez | 340—15.5 |
| 3,392,370 | 7/1968 | Neitzel | 340—15.5 |

RODNEY D. BENNETT, JR., Primary Examiner

C. E. WANDS, Assistant Examiner

UNITED STATES PATENT OFFICE
CERTIFICATE OF CORRECTION

Patent No. 3,466,596                    Dated September 9, 1969

Inventor(s) Lee E. Siems and W. Clay Reeves

It is certified that error appears in the above-identified patent and that said Letters Patent are hereby corrected as shown below:

Col. 7, line 41, "." should read -- , --. Col. 8, line 7, "one" should read -- on --; line 29, "added" second occurrence, should read -- adder --. Col. 9, line 16, "referene" should read -- reference --; line 62, "coverting" should read -- converting --. Col. 10, line 39, "51" should read -- 52 --. Col. 11, line 50, "repesentation" should read -- representation --. Col. 12, line 44, "and" should read -- an --; line 70, "acculated" should read -- accumulated --; line 75, "applied" should read -- applies --. Col. 13, line 5, "acculated" should read -- accumulated --. Col. 14, line 13, "digita" should read -- digital --.

SIGNED AND SEALED

MAR 10 1970

(SEAL)
Attest:

Edward M. Fletcher, Jr.
Attesting Officer

WILLIAM E. SCHUYLER, JR.
Commissioner of Patents